United States Patent [19]

Ward

[11] Patent Number: 4,508,373

[45] Date of Patent: Apr. 2, 1985

[54] UNIVERSAL JOINT

[76] Inventor: Leslie M. Ward, Horton Rd., Ashley Heath, Ringwood, Dorset, England

[21] Appl. No.: 436,580

[22] Filed: Oct. 25, 1982

[51] Int. Cl.³ .............................................. F16L 27/00
[52] U.S. Cl. .................................... 285/226; 285/265; 285/286
[58] Field of Search ............... 285/263, 264, 265, 167, 285/226, DIG. 8, 286

[56] References Cited

U.S. PATENT DOCUMENTS

| | | | |
|---|---|---|---|
| 1,754,127 | 4/1930 | Srulowitz | 285/264 X |
| 1,927,703 | 9/1933 | Glowacki | 285/264 |
| 3,915,482 | 10/1975 | Fletcher | 285/265 X |
| 4,165,107 | 8/1979 | Atta | 285/226 X |

FOREIGN PATENT DOCUMENTS 2029537  3/1980  United Kingdom ................ 285/264

Primary Examiner—Dave W. Arola
Attorney, Agent, or Firm—Harlan P. Huebner

[57] ABSTRACT

A universal joint for a fluid conduit comprises a pair of tubular connectors with cylindrical end portions adapted to be sealingly secured to two adjacent parts of the conduit. A bellows with respective cylindrical ends is sealingly secured within the cylindrical end portions of the tubular connectors, which are also formed with spherically shaped portions fitting one within the other outside the bellows. A spherically shaped load transmitting sleeve is connected to two pairs of diametrically opposed pivots at right angles to each other, with one pair of pivots connecting the sleeve and the outer spherically shaped connector portion, and the other pair of pivots connecting the sleeve and the inner spherically shaped connector portion.

15 Claims, 15 Drawing Figures

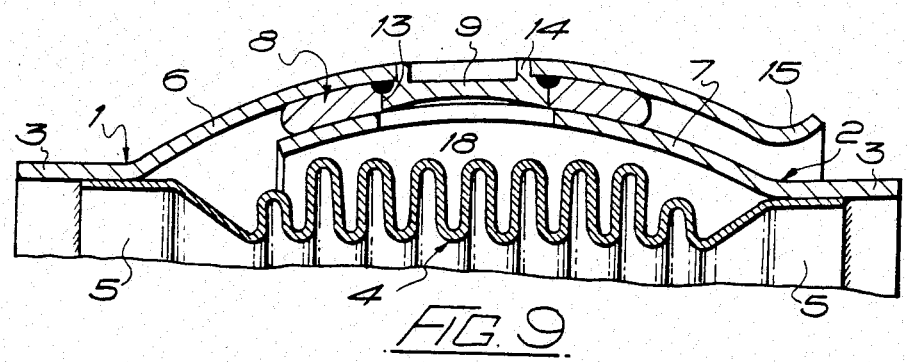
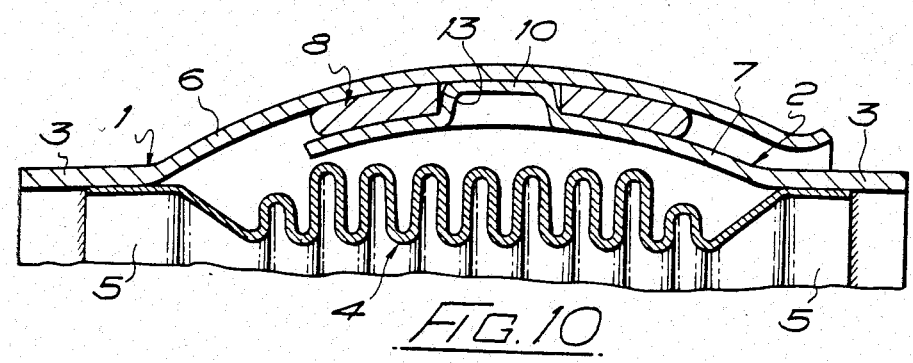
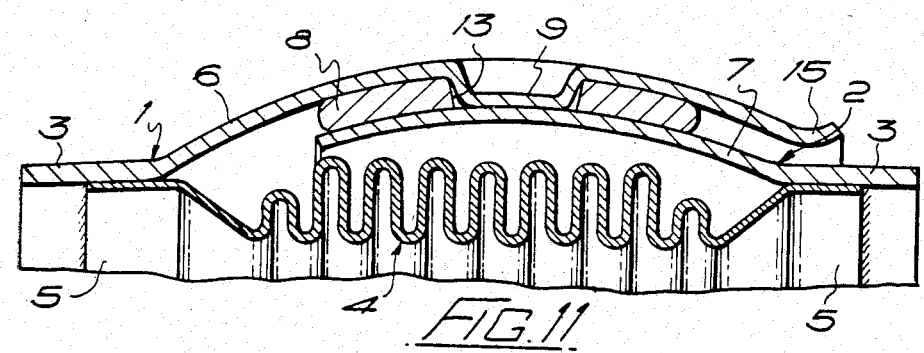

UNIVERSAL JOINT

BACKGROUND OF THE INVENTION

1. Field of the Invention

This invention relates to a universal joint for a fluid conduit and particularly to a bellows sealed universal joint capable of angulating through 360°, such as is used in a pipe or ducting carrying a fluid, particularly air, for example ducted hot air in an aircraft, to cater for thermal expansion, installation tolerances and vibration.

2. Description of the Prior Art

When an internal pressure is applied to the bellows an end load is produced which must be restrained to prevent stretching of the bellows and damage to adjacent structures. Therefore, it is known to sealingly secure cylindrical ends of the bellows in respective tubular connectors adapted to be sealingly secured to two adjacent parts of the conduit, and to provide externally of the tubular connectors means for transmitting end load between the connectors whilst allowing the connectors to angulate through 360°.

In one known form of universal joint of this type, which is widely used in aircraft, the external load transmitting means comprises a ring with two pairs of diametrically opposed pins at right angles to each other, one pair of pins serving as pivotal connections with one tubular connector and the other pair of pins serving as pivotal connections with the other tubular connector, and the adjacent ends of the tubular connectors are profiled to afford sufficient clearance between them to permit angulation through 360°. The disadvantage of this form of universal joint is that the profiled annular gap between the tubular connectors allows ingress of dust and debris which may restrict the freedom of the bellows, and, in the event of leaking of the bellows, allows egress of fluid rapidly from the joint.

Therefore, in another known form of universal joint of the bellows sealed type, which has recently been adopted in aircraft and is described in U.K. Patent Application No. 2,029,537A, the tubular connectors are formed with spherically shaped portions slidingly interfitted one within the other outside the bellows to form a "knuckle joint" capable of angulating through 360°, and the external load transmitting means comprises a sleeve extending beyond both interfitted portions and provided with bearing means between end portions of the sleeve and the respective connectors, the bearing means comprising, for each connector, diametrically oppositely disposed pivotable connections, with the pivotable connections of one of the connectors angularly displaced by 90° from such connections on the other connector. The sleeve and the interfitted, spherically shaped portions of the connectors serve to prevent ingress of dust and debris to the bellows, and close interfitting of the spherically-shaped portions of the connectors greatly restricts egress of fluid from the joint in the event of leaking of the bellows. In one embodiment the pivotable connections are formed by interengaging curved flanges on brackets secured respectively on the sleeve and on the respective connectors, and two pairs of diametrically opposed inwardly directed pins at right-angles to each other are secured to the sleeve and extend, with clearance, into apertures in the interfitted portions of the connectors to assist angulation. The disadvantage of this form of universal joint is that it has a large number of parts which add considerably to its weight and cost, including complications in assembling it.

SUMMARY OF THE INVENTION

The object of the invention is to provide a bellows sealed universal joint capable of angulating through 360° without having the disadvantages of the known forms referred to above.

According to the present invention, a universal joint for a fluid conduit comprises a pair of tubular connectors with cylindrical end portions adapted to be sealingly secured to two adjacent parts of the conduit, a bellows with respective cylindrical ends sealingly secured within the cylindrical end portions of the tubular connectors, which are also formed with spherically shaped load transmitting sleeve, and two pairs of diametrically opposed pivots at right angles to each other, with one pair of pivots connecting the sleeve and the outer spherically shaped connector portion, and with the other pair of pivots connecting the sleeve and the inner spherically shaped connector portion.

The load transmitting sleeve may be a close sliding fit within the inner spherically shaped connector portion or intermediate the spherically shaped connector portions or on the outer spherically shaped connector portion.

If the load transmitting sleeve is a close sliding fit within the inner spherically shaped connector portion or on the outer spherically shaped connector portion, one pair of pivots will require axially extending slots in the inner or outer spherically shaped connector portion (as the case may be) in order to connect the load transmitting sleeve in a load carrying manner to the outer or inner spherically shaped connector portion and to allow relative sliding between the connector portions in the regions of those pivots as angulation of the joint takes place about the other pair of pivots. However, the slots will normally be closed by the load transmitting sleeve either internally or externally.

If, on the other hand, and as is preferred, the load transmitting sleeve is a close sliding fit intermediate the spherically shaped connector portions, no such slots are required. The load transmitting sleeve is preferably formed of thicker material (e.g., stainless steel) than the tubular connectors, the inner connector portion being spun out in situ until it is a close sliding fit within the load transmitting sleeve, which is fixed on the inner connector portion by means of one pair of pivots, and the outer connector portion then being spun down in situ until it is a close sliding fit on the load transmitting sleeve, which is fixed within the outer connector portion by the other pair of pivots. The free end of the outer connector portion preferably extends beyond the respective end of the load transmitting sleeve and is preferably flared. The other end of the load transmitting sleeve is preferably coterminus with the free end of the inner spherically shaped connector portion when the tubular connectors are in axial alignment. The spinning down of the outer tubular connector is preferably interrupted before its cylindrical end portion reaches an internal diameter equal to the overall external diameter of the bellows, the bellows then being inserted from that end and the other end of the bellows welded to the cylindrical end portion of the inner tubular connector, whereafter the spinning down of the outer tubular connector is continued until its cylindrical end portion has an internal diameter enabling the adjacent end of the bellows to be welded to it.

The pivots may be separate members secured to the intermediate load transmitting sleeve, or (preferably) to the respective spherically shaped connector portions, as by welding flanges or spigots on the separate members to the sleeve or (preferably) to the connector portions. The inner spherically shaped connector portion may be provided with a pair of holes affording access for inserting into the sleeve the separate pivot members for the outer spherically shaped connector portion.

Alternatively, the pivots may be formed integral with the respective spherically shaped connector portions, as by pressing dimpled or lipped holes, e.g. two inwardly and two outwardly, extending into holes in the spherically shaped sleeve.

Again, the pivots may be formed by a combination of dimples in the respective spherically shaped connector portions and rings welded to the respective spherically shaped connector portions concentric with the dimples, with the rings fitting into holes in the load transmission sleeve. The outsides of the rings and the insides of the holes may be fruto-conical, whereby the rings must be fitted in the holes before being welded to the respective spherically shaped connector portions, one of which is provided with a pair of holes to permit welding of the rings of the other connector portion around the dimples of the latter.

BRIEF DESCRIPTION OF THE DRAWINGS

A number of embodiments of the invention will now be described, by way of example only, with reference to the accompanying drawings, in which:

FIGS. 8 and 9 also correspond to FIGS. 2 and 3 but relate to a particularly preferred embodiment of the invention;

FIGS. 10 and 11 correspond to FIGS. 8 and 9 but show pivots formed integrally with the connector portions;

BRIEF DESCRIPTION OF THE PREFERRED EMBODIMENTS

Figure 1:
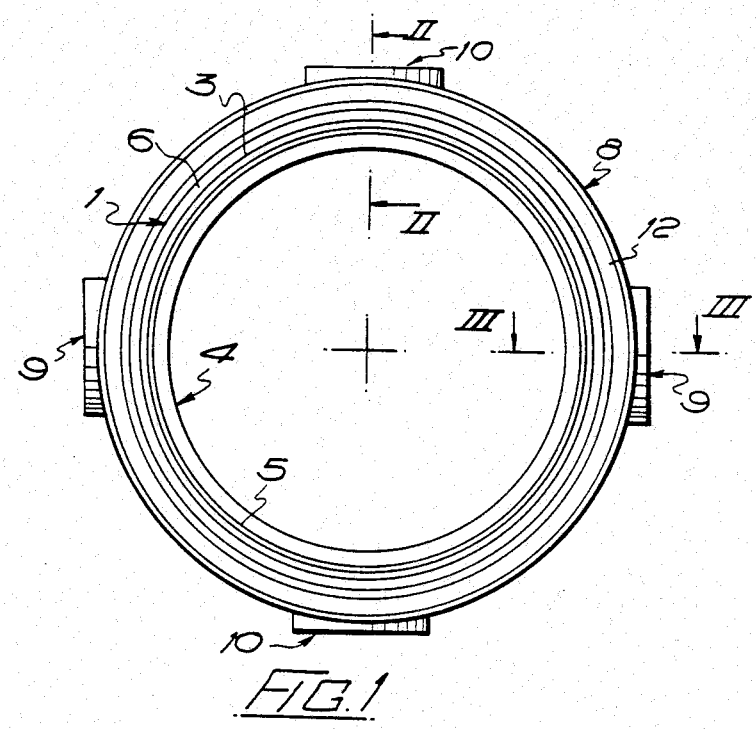
FIG. 1 is an end elevation of a universal joint for a fluid conduit and in accordance with the invention.
Figure 2:
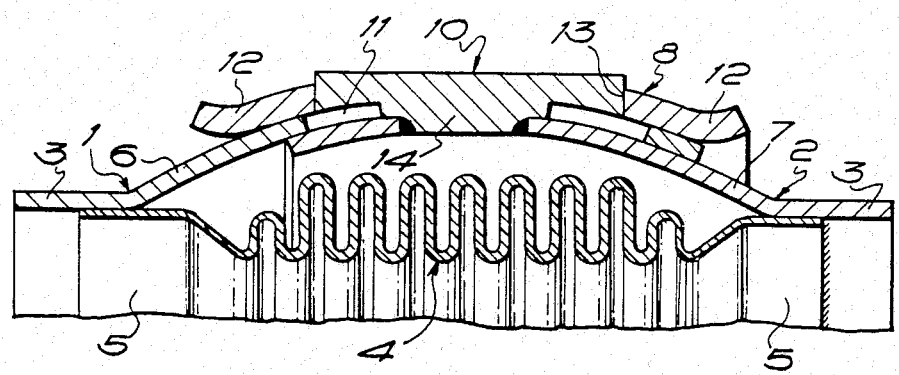
FIGS. 2 and 3 are enlarged fragmentary sections on the lines II—II and III—III respectively of FIG. 1.
Figure 3:
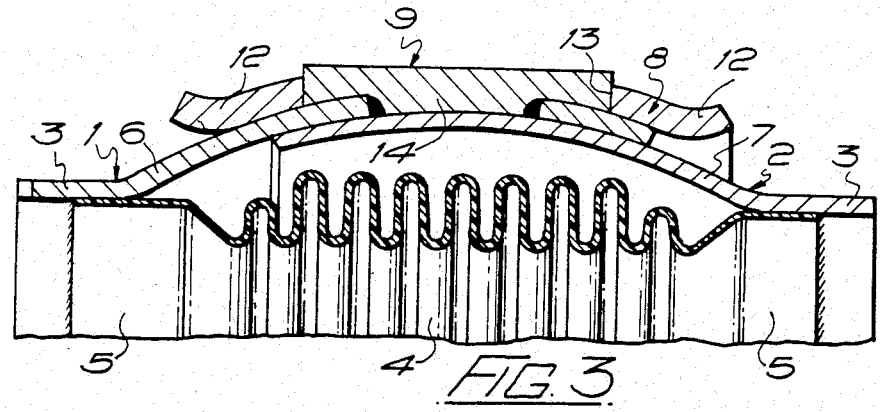

In FIGS. 1 to 3, a universal joint for a fluid conduit comprises a pair of tubular connectors 1, 2 with cylindrical end portions 3 adapted to be sealingly secured to two adjacent parts of a conduit (not shown). A bellows 4 with respective cylindrical ends 5 is sealing secured as by welding within the cylindrical end portions 3 of the tubular connectors 1, 2. The said connectors are also formed with spherically shaped portions 6, 7 fitting one within the other outside the bellows 4. A spherically shaped load transmitting sleeve 8, receives in recesses therein two pairs of diametrically opposed pivots 9 and 10 respectively disposed in the plane of the equator of sleeve 8 at right angles to each other, with one pair of pivots 9 connecting the sleeve 8 and the outer spherically shaped connector portion 6. The other pair of pivots 10 connect the sleeve 8 and the inner spherically shaped connector portion.

Figure 4:
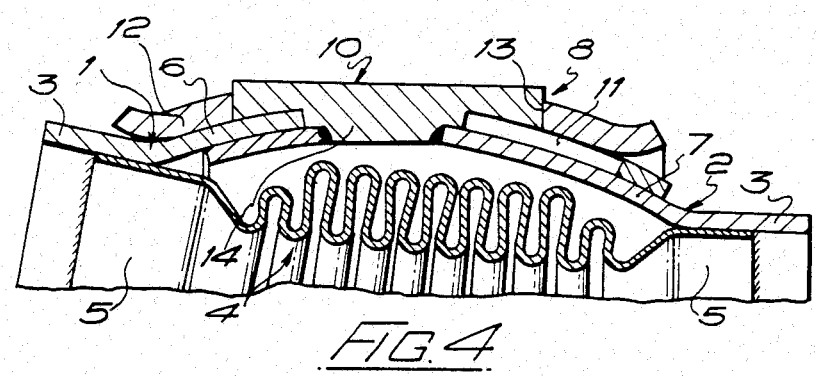
FIGS. 4 and 5 each correspond to FIG. 2 but show the connector portions angled at the respective extreme positions with respect to each other.
Figure 5:
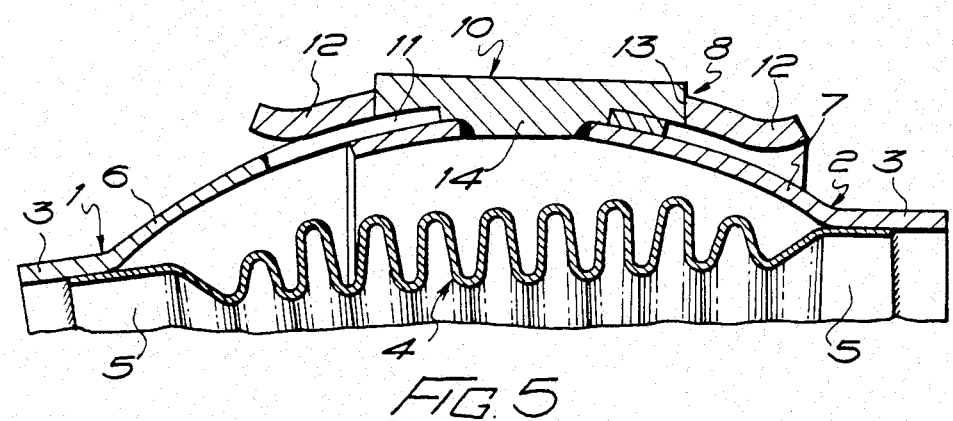

The load transmitting sleeve 8 is a close sliding fit on the outer spherically shaped connector portion 6 and slots 11 (FIG. 2) are provided in that outer connector portion for the pivots 10 in order to allow for relative sliding between the connector portions 6, 7 in the regions of the pivots 10 (as shown in FIGS. 4 and 5) as angulation of the joint takes place about the other pair of pivots 9. However, the slots 11 will normally be closed by the load transmitting sleeve 8. The ends 12 of the load transmitting sleeve 8 are flared so as not to make sharp contact with the respective cylindrical end portions 3 of the connectors 1, 2 when the joint is angulated to its maximum extent about either or both pairs of pivots 9, 10. The pivots 9, 10 are separate members fitting holes 13 in the load transmitting sleeve 8 and secured to the respective connector portions 6, 7 welding spigots 14 thereto.

Figure 6:
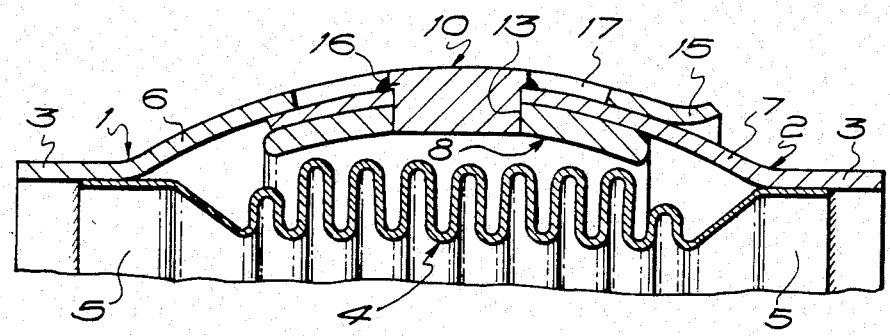
FIGS. 6 and 7 correspond to FIGS. 2 and 3 but relate to another embodiment of universal joint in accordance with the invention.
Figure 7:
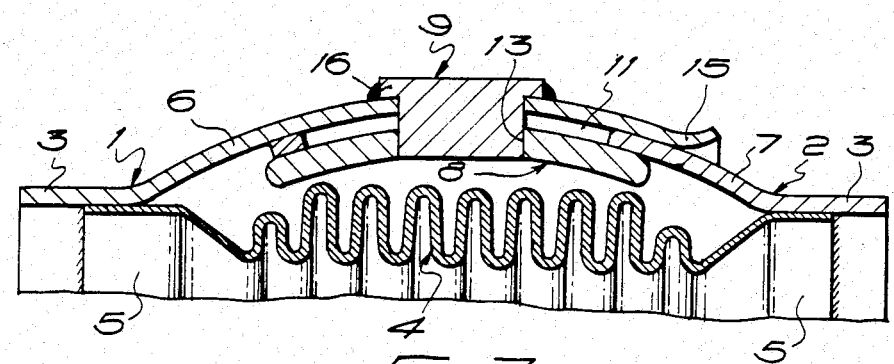

In FIGS. 6 and 7 (and also in the succeeding pairs of Figures) like numerals represent like parts to those shown in FIGS. 1 to 5. In this case the load transmitting sleeve 8A is a close sliding fit within the inner spherically shaped connector portion 7A and so slots 11A (FIG. 7) are provided in that the inner connector portion for the pivots 9A in order to allow for relative sliding between the connector portions 6A, 7A in the regions of the pivots 9A as angulation of the joint takes place about the other pair of pivots 10A. The free end 15 of the outer connector portion 6A is flared. The pivots 9A, 10A are again separate members fitting holes 13A in the sleeve 8A but are secured to the respective connector portions 6A, 7A by welding flanges 16 thereto, and in consequence, the outer connector portion 6A is provided with slots 17 (FIG. 6) to accommodate the flanges 16 of the pivots 10A and allow for relative sliding between the connector portions 6A, 7A in the regions of the pivots 10A as angulation of the joint takes place about the other pair of pivots 9A.

Figure 8:
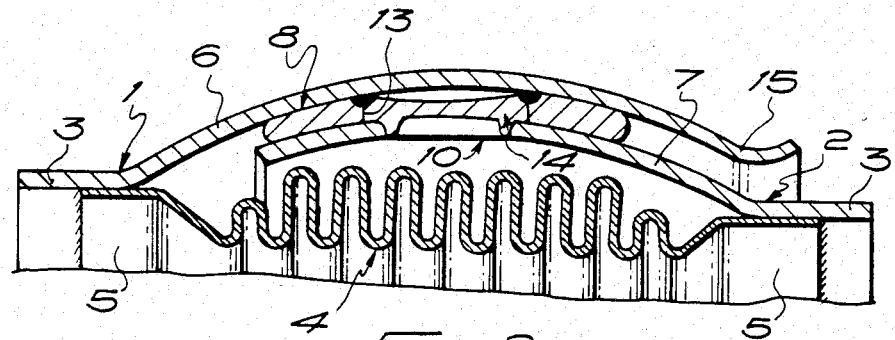

In FIGS. 8 and 9 the load transmitting sleeve 8B is a close sliding fit intermediate the spherically shaped connector portions 6B, 7B so no slots are required in either of them. The free end 15A of the outer connector portion 6B extends beyond the respective end of the load transmitting sleeve 8B and is flared. The inner spherically shaped connector portion 7B is provided with a pair of holes 18 (FIG. 9) affording access for inserting into the sleeve 8B the separate pivot members 9B for the outer spherically shaped connector portion 6B.

In FIGS. 10 and 11 the load transmitting sleeve 8C is again intermediate the connector portions 6C, 7C (as is also the case with the final pairs of Figures) but the pivots 9C, 10C are formed integral with the respective connector portions by pressing dimples, two inwardly (FIG. 11) to form the pivots 9C and two outwardly (FIG. 10) to form the pivots 10C.

Figure 12:
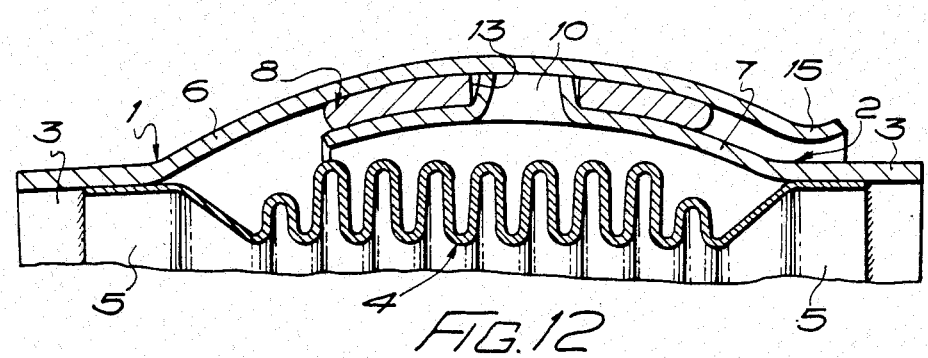
FIGS. 12 and 13 also correspond to FIGS. 8 and 9 but show an alternative way of forming the pivots integrally with the connector portions.
Figure 13:
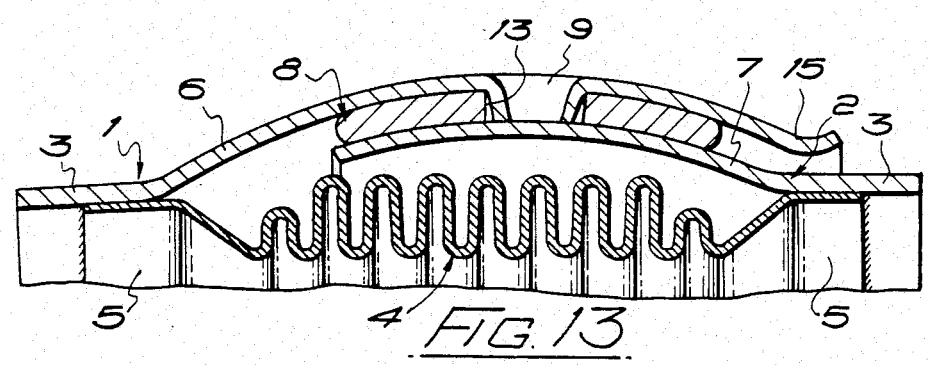

In FIGS. 12 and 13 the pivots 9D, 10D are formed integrally by pressing (or piercing) lipped holes in the connector portions 6D, 7D two inwardly (FIG. 13) and two outwardly (FIG. 12).

Figure 14:
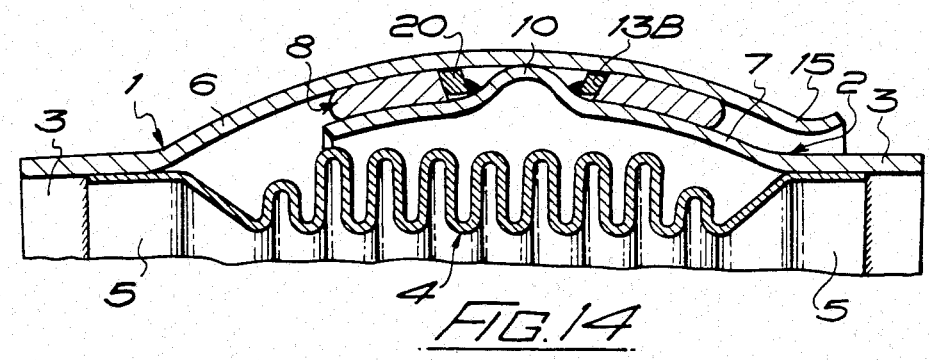
FIGS. 14 and 15 likewise correspond to FIGS. 8 and 9 but show another way of providing the pivots.
Figure 15:
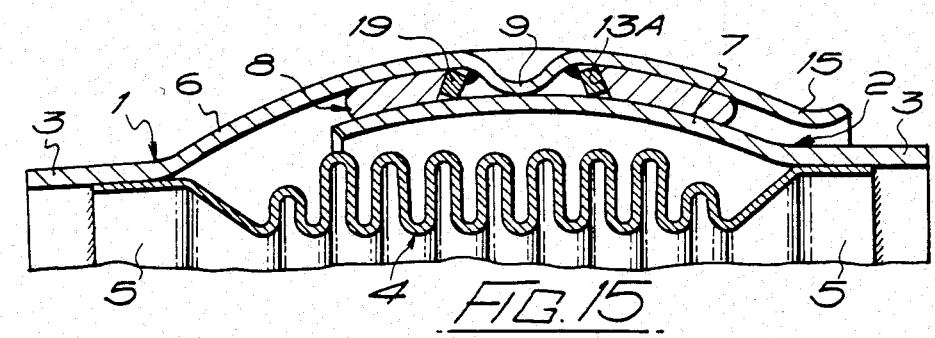

In FIGS. 14 and 15 the pivots 9E, 10E are formed by a combination of dimples in the respective connector portions 6E, 7E and rings 19, 20 welded to the respective connector portions concentric with the dimples, with the rings fitting into holes 13A, 13B in the load transmission sleeve 8E, the outsides of the rings 19, 20 and the insides of the holes 13A, 13B being frusto-conical, whereby the rings must be fitted in the holes before being welded to the respective spherically shaped connector portions, the inner connector portion 7E being provided with a pair of holes 21 to permit the rings 19 to be welded around the dimples 9E in the outer connector portion 6E.

While the above embodiments have been disclosed as the best mode presently contemplated by the inventors, it should be realized that these examples should not be interpreted as limiting, because artisans skilled in this field, once given the present teachings can vary from these specific embodiments. Accordingly, the scope of the present invention should be determined solely from the claims.

I claim:

1. A universal joint for a fluid conduit comprising a pair of tubular connectors with cylindrical end portions adapted to be sealingly secured to two adjacent parts of the conduit, a bellows with respective cylindrical ends sealingly secured within the cylindrical end portions of the tubular connectors, which are also formed with spherically shaped portions fitting one within the other outside the bellows, a spherically shaped load transmitting sleeve having recesses within which there are pivoted two pairs of diametrically opposed pivots disposed in the plane of the equator of said sleeve at right angles to each other, with one pair of pivots connecting the sleeve and the outer spherically shaped connector portion, and with the other pair of pivots connecting the sleeve and the inner spherically shaped connector portion.

2. A universal joint as in claim 1, wherein the load transmitting sleeve is a close sliding fit within the inner spherically shaped connector portion, and axially extending slots are provided in the inner spherically shaped connector portion for the pivots of the outer spherically shaped connector portion.

3. A universal joint as in claim 1, wherein the load transmitting sleeve is a close sliding fit on the outer spherically shaped connector portion, and axially extending slots are provided in the outer spherically shaped connector portion for the pivots of the inner spherically shaped connector portion.

4. A universal joint as in claim 1, wherein the load transmitting sleeve is a close sliding fit intermediate the spherically shaped connector portions.

5. A universal joint as in claim 1, wherein the load transmitting sleeve is formed of thicker material than the tubular connectors.

6. A universal joint as in claim 4, wherein the pivots are separate members secured to the intermediate load transmitting sleeve.

7. A universal joint as in claim 1, wherein the pivots are separate members secured to the respective spherically shaped connector portions.

8. A universal joint as in claim 7, wherein the separate pivot members have flanges for securing them by welding.

9. A universal joint as in claim 7, wherein the separate pivot members have spigots for securing them by welding.

10. A universal joint as in claim 7, wherein the inner spherically shaped connector portion is provided with a pair of holes affording access for inserting into said sleeve said separate pivot members for said outer spherically shaped connector portion.

11. A universal joint as in claim 1, wherein the pivots are formed integral with the respective spherically shaped connector portions.

12. A universal joint as in claim 11, wherein the pivots are formed by pressing dimples extending into holes in the spherically shaped sleeve.

13. A universal joint as in claim 11, wherein the pivots are formed by pressing lipped holes extending into holes in the spherically shaped sleeve.

14. A universal joint as in claim 1, wherein the pivots are formed by a combination of dimples in the respective spherically shaped connector portions and rings welded to the respective spherically shaped connector portions concentric with the dimples, with the rings fitting into holes in the load transmission sleeve.

15. A universal joint as in claim 14, wherein the outsides of the rings and the insides of the holes are frustoconical, and so the rings are fitted in the holes before being welded to the respective spherically shaped connector portions, one of which is provided with a pair of holes to permit welding of the rings of the other connector portion around the dimples of the latter.

* * * * *